(12) United States Patent
Seo et al.

(10) Patent No.: US 7,664,371 B2
(45) Date of Patent: Feb. 16, 2010

(54) RECORDING MEDIUM HAVING DATA STRUCTURE FOR MANAGING REPRODUCTION OF STILL IMAGES RECORDED THEREON AND RECORDING AND REPRODUCING METHODS AND APPARATUSES

(75) Inventors: Kang Soo Seo, Kyunggi-do (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 782 days.

(21) Appl. No.: 10/656,109

(22) Filed: Sep. 8, 2003

(65) Prior Publication Data

US 2004/0047607 A1 Mar. 11, 2004

(30) Foreign Application Priority Data

Sep. 6, 2002 (KR) .................. 10-2002-0053830
Sep. 6, 2002 (KR) .................. 10-2002-0053858

(51) Int. Cl.
 *H04N 7/00* (2006.01)
(52) U.S. Cl. .................. 386/95; 386/46; 386/124; 386/125
(58) Field of Classification Search .............. 386/95, 386/125, 126, 45
 See application file for complete search history.

(56) References Cited

U.S. PATENT DOCUMENTS

| 5,854,873 | A | 12/1998 | Mori et al. |
| 5,870,523 | A | 2/1999 | Kikuchi et al. |
| 5,884,004 | A | 3/1999 | Sato et al. |
| 5,907,658 | A | 5/1999 | Murase et al. |
| 5,999,698 | A | 12/1999 | Nakai et al. |
| 6,122,436 | A | 9/2000 | Okada et al. |
| 6,157,769 | A | 12/2000 | Yoshimura et al. |
| 6,266,483 | B1 * | 7/2001 | Okada et al. .................. 386/128 |
| 6,285,826 | B1 | 9/2001 | Murase et al. |
| 6,308,005 | B1 | 10/2001 | Ando et al. |
| 6,341,196 | B1 | 1/2002 | Ando et al. |
| 6,353,702 | B1 | 3/2002 | Ando et al. |
| 6,369,835 | B1 | 4/2002 | Lin |
| 6,374,037 | B1 | 4/2002 | Okada et al. |

(Continued)

FOREIGN PATENT DOCUMENTS

AU      6672298      9/1998

(Continued)

OTHER PUBLICATIONS

United States Office Action dated May 29, 2008.

(Continued)

*Primary Examiner*—Thai Tran
*Assistant Examiner*—Girumsew Wendmagegn
(74) *Attorney, Agent, or Firm*—Harness, Dickey & Pierce, PLC

(57) ABSTRACT

The recording medium has an information file area that includes at least one information file. The information file is associated with a data file recorded on the recording medium, and the data file includes at least video data. The information file includes a type indicator indicating whether the video data in the data file is for at least one still image.

11 Claims, 14 Drawing Sheets

U.S. PATENT DOCUMENTS

| | | | |
|---|---|---|---|
| 6,385,389 B1 | 5/2002 | Maruyama et al. | |
| 6,393,430 B1 | 5/2002 | Van Ryzin | |
| 6,400,893 B1 * | 6/2002 | Murase et al. | 386/125 |
| 6,442,337 B1 | 8/2002 | Okada et al. | |
| 6,470,460 B1 | 10/2002 | Kashiwagi et al. | |
| 6,493,504 B1 | 12/2002 | Date et al. | |
| 6,532,335 B2 | 3/2003 | Otomo et al. | |
| 6,574,419 B1 | 6/2003 | Nonomura et al. | |
| 6,580,870 B1 | 6/2003 | Kanazawa et al. | |
| 6,594,442 B1 | 7/2003 | Kageyama et al. | |
| 6,798,976 B2 | 9/2004 | Tsumagari et al. | |
| 6,823,010 B1 * | 11/2004 | Curet et al. | 375/240.12 |
| 6,829,211 B2 | 12/2004 | Sako et al. | |
| 6,856,756 B1 | 2/2005 | Mochizuki et al. | |
| 6,943,684 B2 | 9/2005 | Berry | |
| 6,999,674 B1 | 2/2006 | Hamada et al. | |
| 7,054,545 B2 | 5/2006 | Ando et al. | |
| 7,224,890 B2 | 5/2007 | Kato | |
| 7,236,687 B2 * | 6/2007 | Kato et al. | 386/95 |
| 2001/0000809 A1 | 5/2001 | Ando et al. | |
| 2001/0016112 A1 | 8/2001 | Heo et al. | |
| 2001/0043790 A1 | 11/2001 | Saeki et al. | |
| 2001/0046371 A1 | 11/2001 | Ando et al. | |
| 2002/0035575 A1 | 3/2002 | Taira et al. | |
| 2002/0085022 A1 | 7/2002 | Masuda et al. | |
| 2002/0127001 A1 | 9/2002 | Gunji et al. | |
| 2002/0135607 A1 | 9/2002 | Kato et al. | |
| 2002/0135608 A1 | 9/2002 | Hamada et al. | |
| 2002/0145702 A1 | 10/2002 | Kato et al. | |
| 2002/0164152 A1 | 11/2002 | Kato et al. | |
| 2002/0172496 A1 | 11/2002 | Gunji et al. | |
| 2003/0014760 A1 * | 1/2003 | Yamauchi et al. | 725/105 |
| 2003/0235406 A1 | 12/2003 | Seo et al. | |
| 2004/0057700 A1 | 3/2004 | Okada et al. | |
| 2004/0141436 A1 | 7/2004 | Monahan | |
| 2004/0179820 A1 | 9/2004 | Kashiwagi et al. | |
| 2004/0184780 A1 | 9/2004 | Seo et al. | |
| 2004/0213552 A1 | 10/2004 | Kato | |
| 2005/0105888 A1 | 5/2005 | Hamada et al. | |
| 2005/0163463 A1 | 7/2005 | Schick et al. | |
| 2005/0196143 A1 | 9/2005 | Kato et al. | |
| 2005/0201718 A1 | 9/2005 | Kato | |
| 2005/0254363 A1 | 11/2005 | Hamada et al. | |
| 2006/0195633 A1 | 8/2006 | Plourde, Jr. | |

FOREIGN PATENT DOCUMENTS

| | | |
|---|---|---|
| AU | 2003282415 | 6/2004 |
| CN | 1205503 | 1/1999 |
| CN | 1240293 | 1/2000 |
| CN | 1245957 | 3/2000 |
| CN | 1263672 | 8/2000 |
| CN | 1063863 | 3/2001 |
| CN | 1303094 | 7/2001 |
| CN | 1304533 | 7/2001 |
| CN | 1381137 | 11/2002 |
| DE | 69907758 | 2/2004 |
| DE | 60002774 | 3/2004 |
| EP | 0856849 | 8/1998 |
| EP | 0949825 | 10/1999 |
| EP | 0978994 | 2/2000 |
| EP | 1003337 | 5/2000 |
| EP | 1041566 | 10/2000 |
| EP | 1045393 | 10/2000 |
| EP | 1056094 | 11/2000 |
| EP | 1102270 | 5/2001 |
| EP | 1113439 | 7/2001 |
| EP | 1128386 | 8/2001 |
| EP | 0942609 | 10/2001 |
| EP | 1198133 A1 | 4/2002 |
| EP | 1204269 | 5/2002 |
| EP | 1300851 | 4/2003 |
| FR | 2581771 | 11/1986 |
| GB | 2119151 | 11/1983 |
| GB | 2359210 | 8/2001 |
| JP | 1-300777 | 12/1989 |
| JP | 06-311481 | 11/1994 |
| JP | 07-57436 | 3/1995 |
| JP | 07-262646 | 10/1995 |
| JP | 1997-017101 | 1/1997 |
| JP | 10-154373 | 6/1998 |
| JP | 2000-004421 | 1/2000 |
| JP | 2000-020554 | 1/2000 |
| JP | 2000-041212 | 2/2000 |
| JP | 2000-059714 | 2/2000 |
| JP | 2000-333126 | 11/2000 |
| JP | 2001-052467 | 2/2001 |
| JP | 2001-069460 | 3/2001 |
| JP | 2001-078123 | 3/2001 |
| JP | 2001-086458 | 3/2001 |
| JP | 2001-103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |
| JP | 2001-231015 | 8/2001 |
| JP | 2001-285772 | 10/2001 |
| JP | 2002-82684 | 3/2002 |
| JP | 2002-208258 | 7/2002 |
| JP | 2002-325221 | 11/2002 |
| JP | 2002-354424 | 12/2002 |
| JP | 2003-16764 | 1/2003 |
| JP | 2003-045154 | 2/2003 |
| JP | 2003-299015 | 10/2003 |
| JP | 2004-336566 | 11/2004 |
| KR | 1998-0086030 | 12/1998 |
| KR | 1999-0070106 | 9/1999 |
| KR | 10-2000-0002840 | 1/2000 |
| KR | 10-2000-0002921 | 1/2000 |
| KR | 10-2000-0002922 | 1/2000 |
| KR | 10-2000-0014419 | 3/2000 |
| KR | 10-2000-0018987 | 4/2000 |
| KR | 10-2001-0013565 | 2/2001 |
| KR | 10-2001-0021485 | 3/2001 |
| KR | 10-2001-0027114 | 4/2001 |
| KR | 10-2001-0051295 | 6/2001 |
| KR | 10-2001-0066211 | 7/2001 |
| KR | 10-2002-0021402 | 3/2002 |
| KR | 10-2002-0064463 | 8/2002 |
| KR | 10-2003-0064546 | 8/2003 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 | 9/2000 |
| WO | WO 0060598 | 10/2000 |
| WO | WO 00/74061 | 12/2000 |
| WO | WO 01/82608 | 11/2001 |
| WO | WO 01/82609 | 11/2001 |
| WO | WO 02/062061 | 8/2002 |
| WO | WO 2004/023234 | 3/2004 |
| WO | WO 2004/023484 | 3/2004 |
| WO | WO 2004/023485 | 3/2004 |
| WO | WO 2004/066281 | 8/2004 |
| WO | WO 2004/075194 | 9/2004 |
| WO | WO 2004/086396 | 10/2004 |

OTHER PUBLICATIONS

United States Office Action dated Jun. 2, 2008.
Japanese Office Action dated May 20, 2008.
European Office Action dated May 16, 2008.
Russian Office Action dated Sep. 18, 2007.

European Telecommunications Standards Institute, "*Digital Video Broadcasting (DVB); Subtitling systems*", 1997, pp. 1-45.
Chinese Office Action dated Oct. 3, 2008 with English translation.
"Information Technology—Generic coding of moving pictures and associated audio Information: Systems," International Standard, Second Edition, ISO/IEC 13818-1: 2000(E).
European Search Report dated Sep. 1, 2008.
Japanese Office Action dated Sep. 24, 2008.
European Search Report dated Jul. 30, 2008.
Japanese Office Action dated Jun. 10, 2008.
Japanese Office Action dated Jun. 20, 2008.
English translation of Chinese Office Action dated Aug. 8, 2008.
Japanese Office Action dated Sep. 16, 2008.
International Search Report, dated Nov. 28, 2003.
Australian Office Action dated Jan. 7, 2009.
Supplemental European Search Report dated May 7, 2009.
Australian Office Action dated May 28, 2009.
European Office Action dated Jul. 30, 2009.
Australian Office Action dated Aug. 17, 2009.

* cited by examiner

Still*.tdat

Still*.info (){
```
type_indicator
version_number
length
if (length != 0){
        number_of_still_images
        still_block_number
        tn_block_size
        for (i=0; j<number_of_still_images; j++){
                still_image_index
                image_byte_size
                horizontal_image_size
                vertical_image_size
        }
    }
}
```

RECORDING MEDIUM HAVING DATA STRUCTURE FOR MANAGING REPRODUCTION OF STILL IMAGES RECORDED THEREON AND RECORDING AND REPRODUCING METHODS AND APPARATUSES

FOREIGN PRIORITY

The present invention claims priority under 35 U.S.C. 119 on Korean Application No. 2002-53858 filed Sep. 6, 2002 and Korean Application No. 2002-53830 filed Sep. 6, 2002; the contents of each above-cited Korean applications are incorporated by reference in their entirety.

BACKGROUND OF THE INVENTION

1. Field of the Invention

The present invention relates to a recording medium having a data structure for managing reproduction of at least still images recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) and Blu-ray Disk ROM (BD-ROM) are examples of these new optical disks.

The standardization for high-density read-only optical disks such as the Blu-ray ROM (BD-ROM) is still under way. An effective data structure for managing reproduction of still images recorded on the high-density read-only optical disk such as a BD-ROM is not yet available.

SUMMARY OF THE INVENTION

The recording medium according to the present invention includes a data structure for managing reproduction of at least still images recorded on the recording medium.

In one exemplary embodiment, an information file area of the recording medium includes at least one information file. The information file is associated with a data file recorded on the recording medium, and the data file includes at least video data. The information file includes a type indicator indicating whether the video data in the data file is for at least one still image.

In another exemplary embodiment, a data area stores the data file, and the data file includes video data representing at least one still image. Here, each still image in the data file is recorded as a packetized elementary stream packet.

In yet another exemplary embodiment, a data area stores the data file, the data file includes video data representing at least one still image, and the video data in the data file is recorded as one or more packetized elementary stream packets. In this embodiment, only one still image is represented by each packetized elementary stream packet in the data file.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

In order that the invention may be fully understood, exemplary embodiments thereof will now be described with reference to the accompanying drawings.

Figure 1:
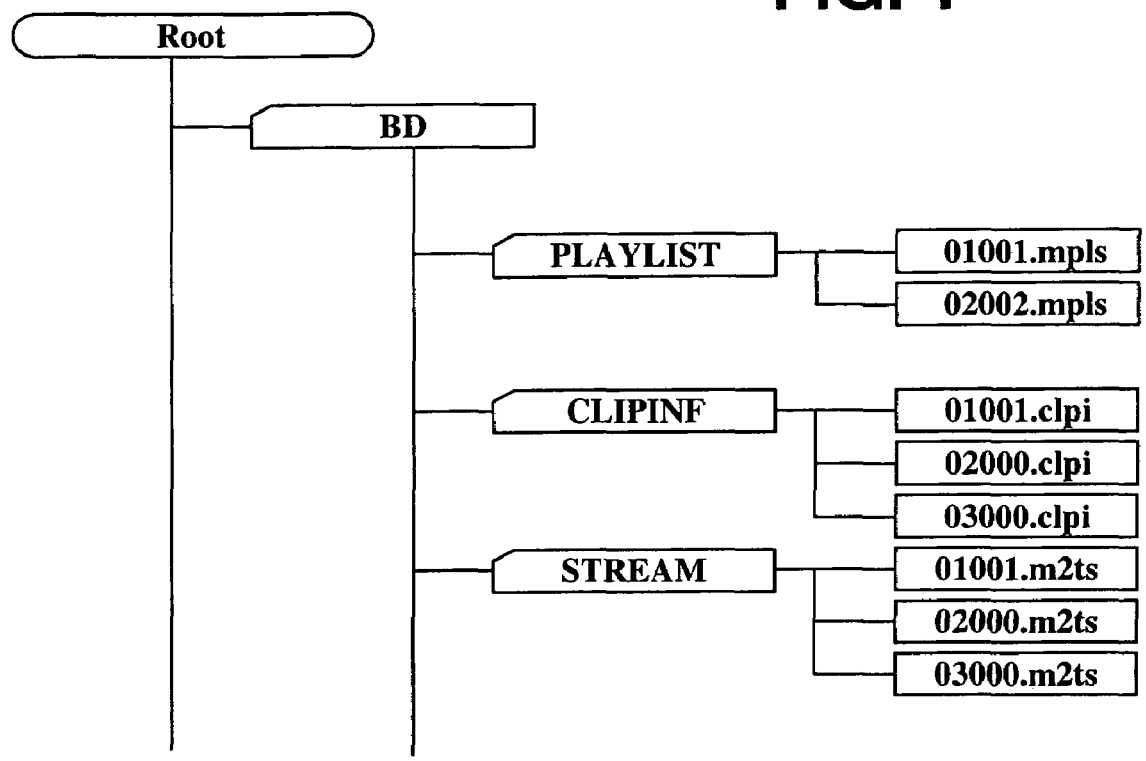
FIG. 1 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will not be described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

The general information files (not shown) provide general information for managing the reproduction of the A/V streams recorded on the optical disk.

Figure 2:
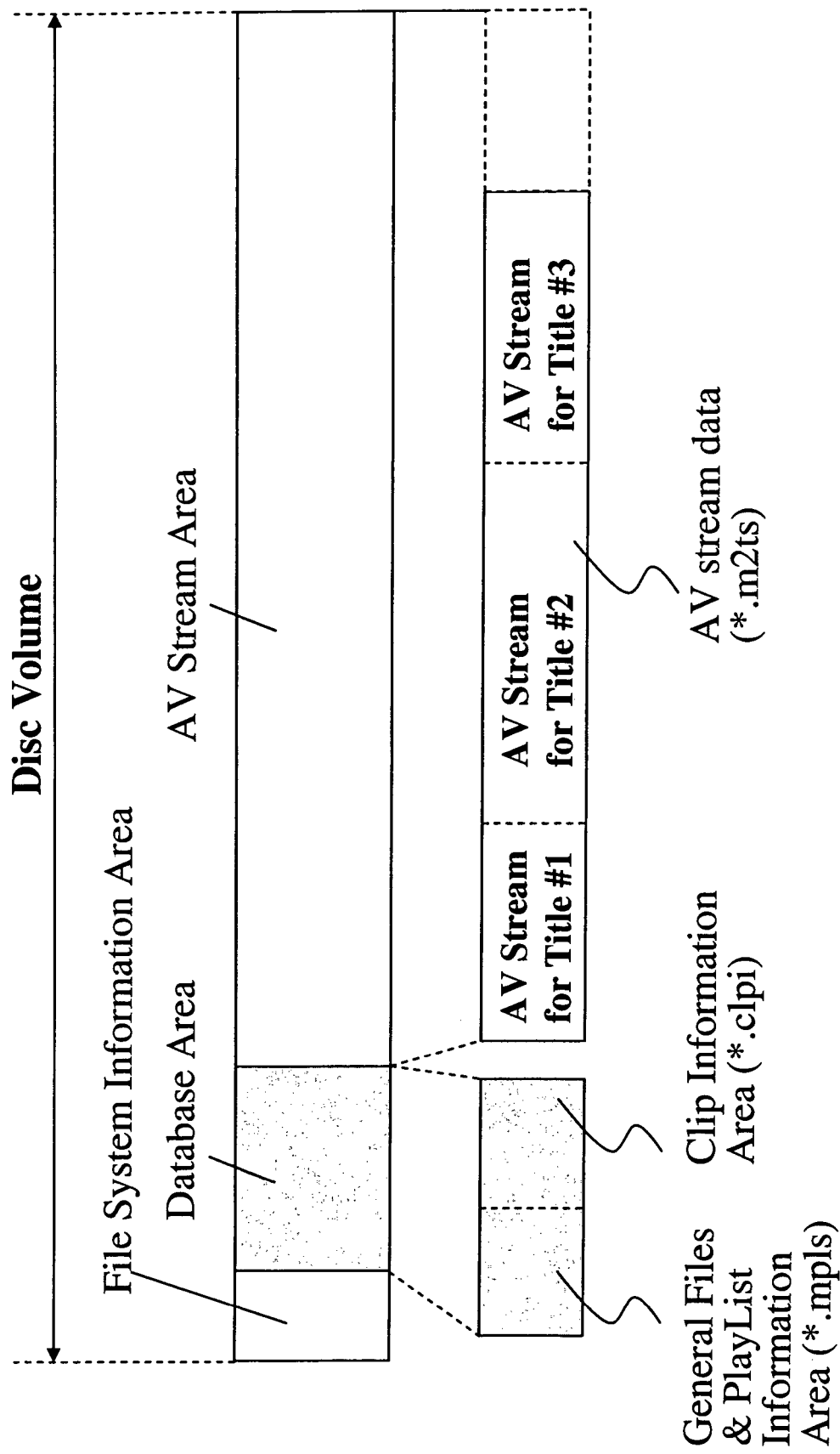
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images may be recorded and reproduced in an organized and/or user interactive fashion, for example, as slideshows. The data structure for managing reproduction of still images for a high-density optical disk in accordance with embodiments of the present invention will be described along with methods and apparatuses according to embodiments of the present invention for recording and reproducing still images.

Figure 3:
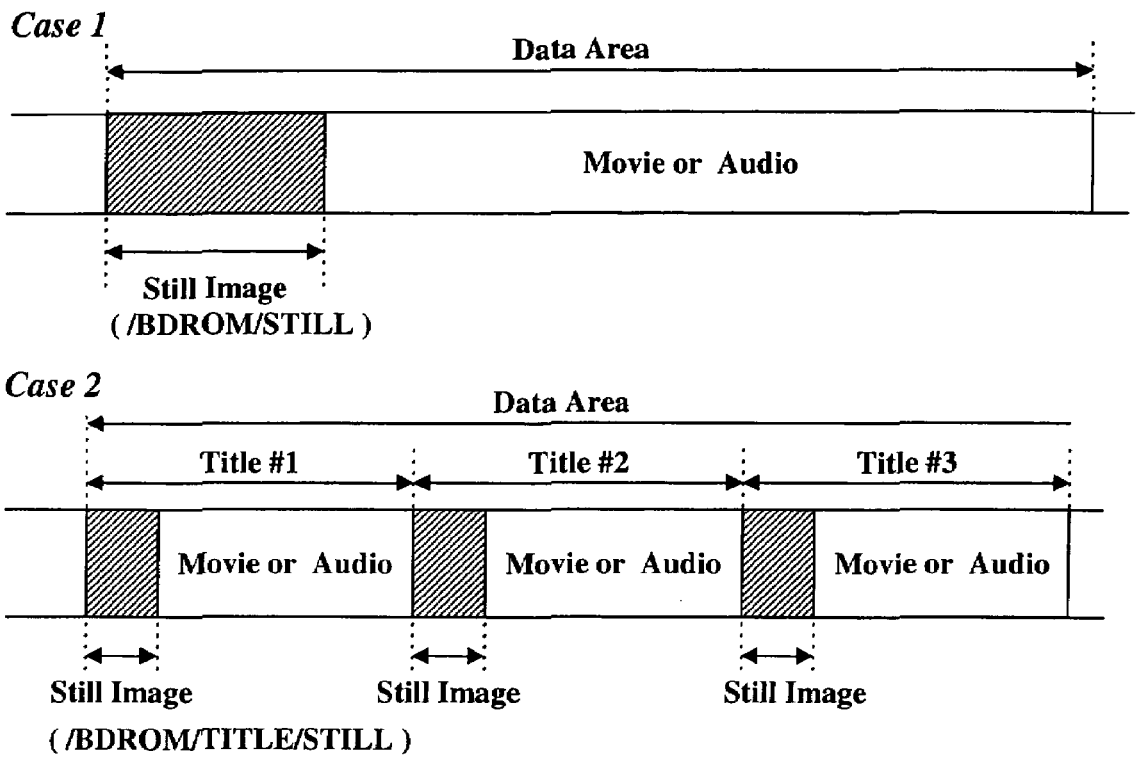
FIG. 3 illustrates a method of managing still images for a high-density recording medium in accordance with one embodiment of the invention.

FIG. 3 illustrates a method of managing still images for a high-density recording medium (e.g., high-density optical disk such as a BD-ROM disk) in accordance with one embodiment of the invention. In this embodiment, a part of the data area on, for example, a BD-ROM is reserved exclusively for still images and one or more still images (e.g., MPEG I, JPEG, etc.) are recorded in the still image recording area. Alternatively, a still image recording area is allocated to each of the titles recorded in the data area and still images pertaining to each title are recorded in the associated still image recording area.

Figure 4:
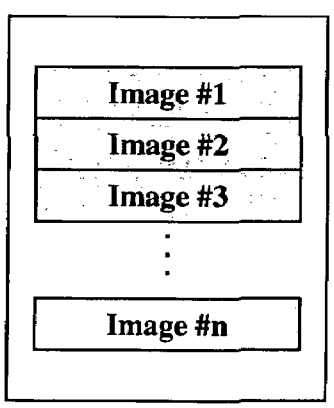
FIGS. 4-7 illustrate further methods of recording and managing still image and still information files according to embodiments of the present invention.

As illustrated in FIG. 4, the still images (e.g., MPEG I, JPEG, etc.) are stored in a still image file (Still*.tdat) and navigation information associated with the still image file is stored in a still information file (Still*.Info).

The still information file includes various information fields such as 'type_indicator', 'version_number', 'length', etc. The 'type_indicator' field indicates that the information file is for managing still images and thus indicates that the data in the associated still image file includes data for one or more still images. The 'version_number' field indicates the syntax version of the still information file, and the 'length' field indicates the size of the syntax data, which is the length of the information field subsequent to the 'length' field.

If the length is not zero, then the 'number_of_still_images' field indicates the number of still images stored in the still image file associated with the still information file and the 'tn_block_size' field indicates block size of a still image. As shown in FIG. 4, the still information file also includes fields of 'still_image_index', 'image_byte_size', 'horizontal_image_size', and 'vertical_image_size'. The function of each field is indicated in the name of the field, and these fields correspond to each of the still images stored in the still image file.

Figure 5:
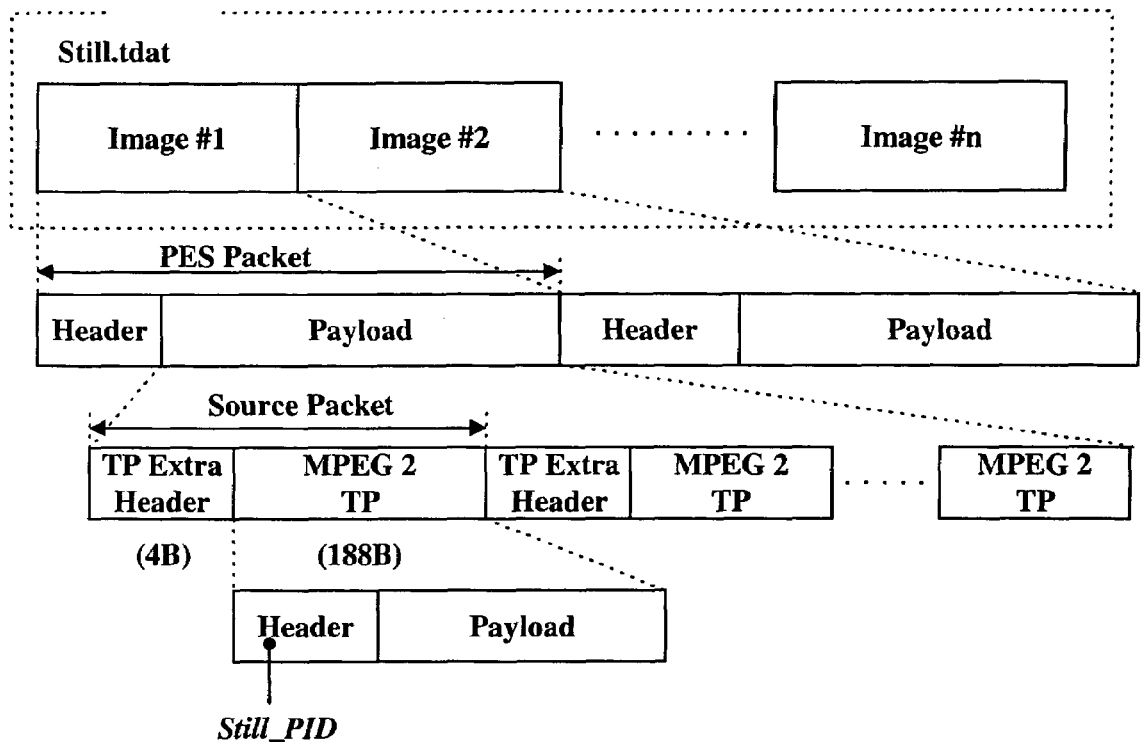

When one or more still images are stored in a still image file (Still*.tdat) as mentioned above, each of the still images is stored as a PES (packetized elementary stream) packet defined in the MPEG standards. As shown in FIG. 5, the payload of a PES packet comprises a plurality of source packets, each comprising a 4-byte TP (Transport Packet) extra header and a 188-byte MPEG2 TP.

The header of the MPEG2 transport packet includes still PID information for indicating that the packet delivers a still image. The still PID is given a value not previously used in standards for the recording medium (e.g., BD-RE for high-density optical disks).

Figure 6:
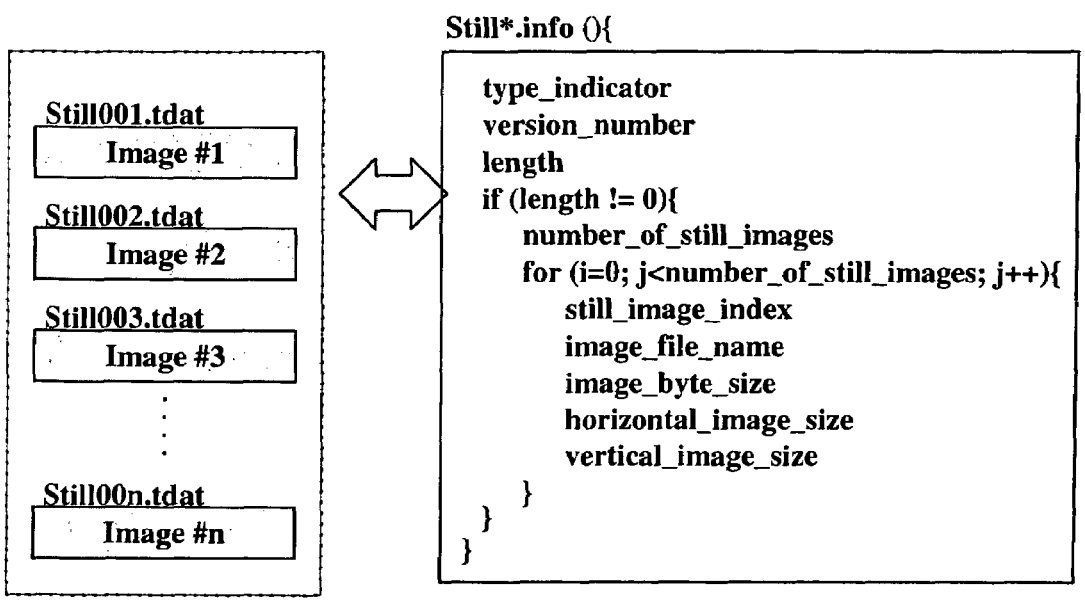

In the alternative embodiment shown in FIG. 6, still images are stored in separate still image files (Still001.tda, Still002.tdat, . . . ) and the navigation information associated with the still images is stored in a single still information file (Still*.Info).

The still information file includes the fields of 'type_indicator', 'version_number', 'length', and 'number_of_still_images' mentioned above with reference to the embodiment of FIG. 4. For each still image, the still information file also includes an 'image_file_name' field for storing the name of each image file as well as the fields of 'still image index', 'image_byte_size', 'horizontal_image_size', and 'vertical_image_size'.

Figure 7:
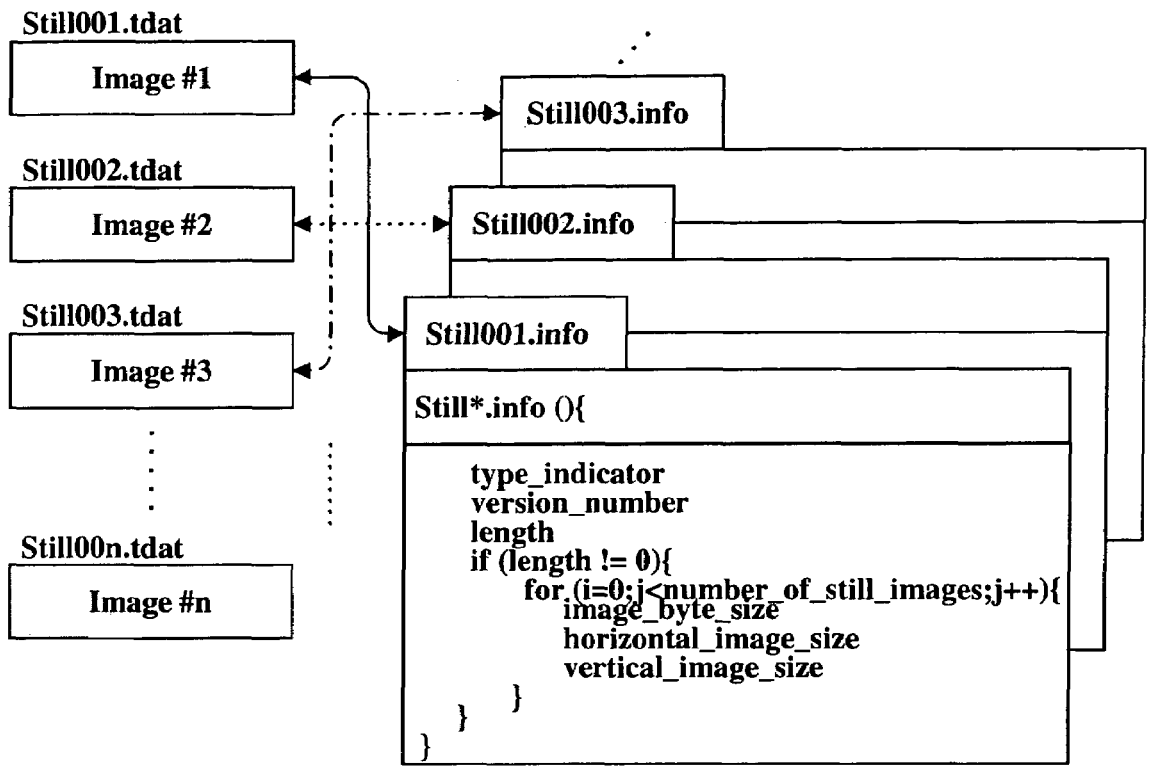

FIG. 7 illustrates a method of managing still images for a high-density recording medium according to another embodiment of the invention. In the embodiment shown in FIG. 7, each of the still images is stored in a still image file (Still001.tda, Still002.tdat, . . . ) and the navigation information associated with each of the still images is stored in a still information file (Still001. Info, Still002. Info, . . . ). Each of the still information files includes the fields of 'type_indicator', 'version_number', 'length', 'image byte size', 'horizontal_image size' and 'vertical_image_size' mentioned above with reference to FIG. 4.

Figure 8:
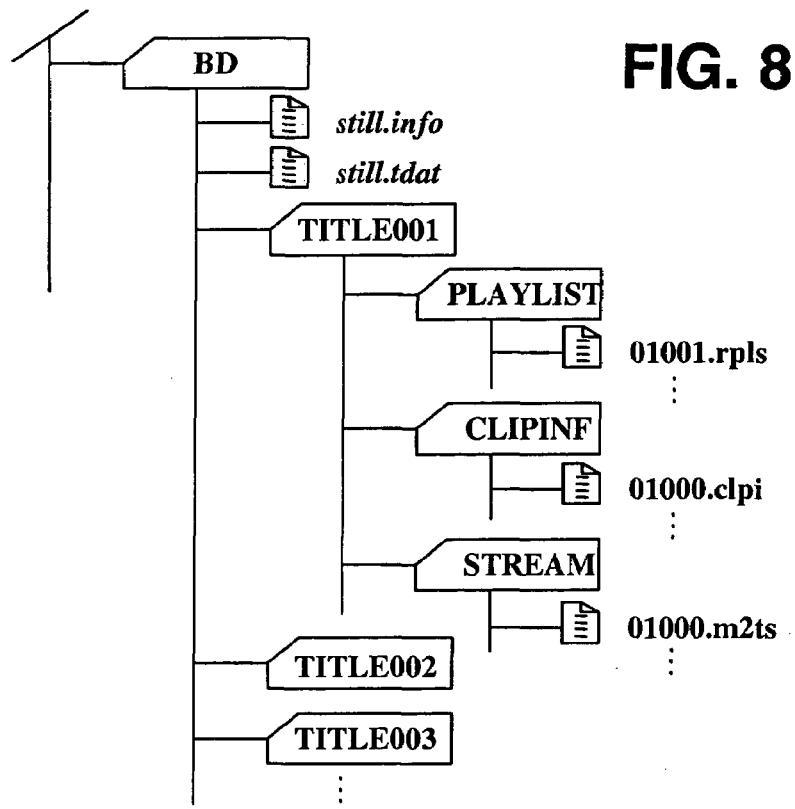
FIGS. 8-11 illustrate further embodiments of file structures for a high-density recording medium according to the present invention.

Alternative file structures to that of FIG. 1 for effectively managing still images and still information files will now be described in detail. FIG. 8 illustrates a file structure of a high-density recording medium in accordance with one embodiment of the invention, wherein a plurality of still images are stored in a still image file (still.tdat) and navigation information for the still images is also stored in a still information file (still.info) as described before. The still image file and still information file can be placed in the root directory, for example, 'BD'.

The root directory 'BD' contains a plurality of title directories (TITLE001, TITLE002, . . . ) and each of the title directories contain subdirectories such as PLAYLIST, CLIPINF, and STREAM.

Figure 9:
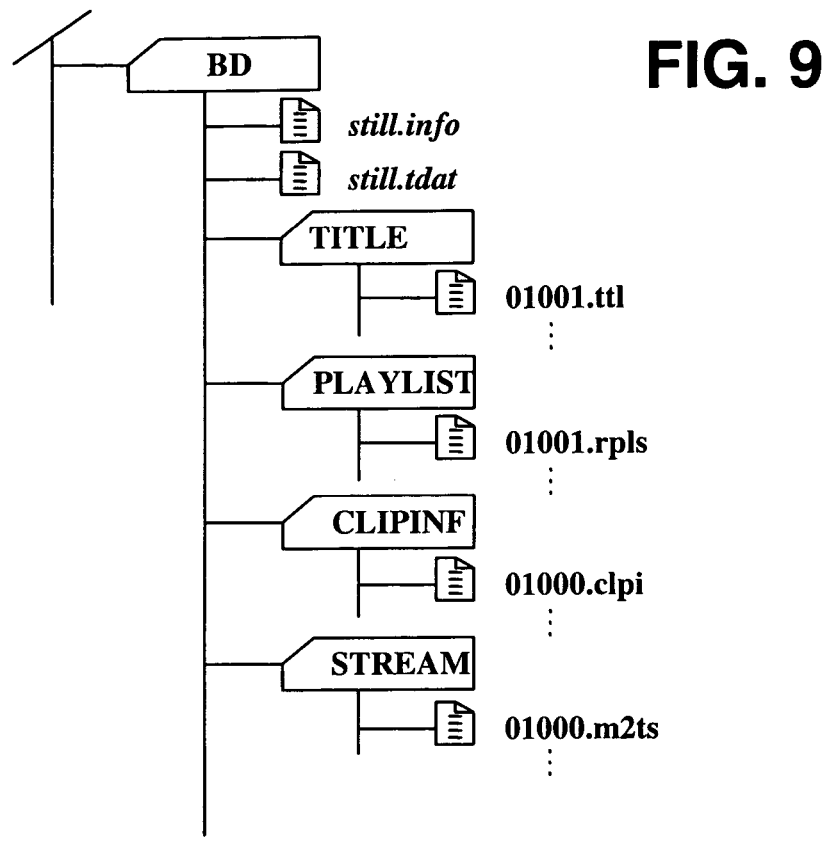

In a file structure shown in FIG. 9, both the still image file and the still information file are placed in the root directory 'BD' and TITLE, PLAYLIST, CLIPINF, and STREAM directories are placed in the root directory 'BD' as well.

Figure 10:
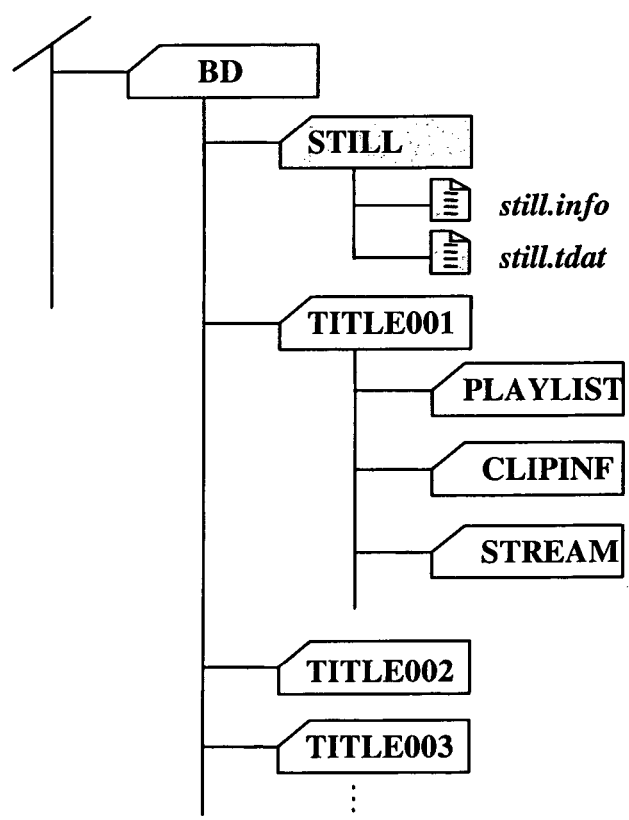

In a file structure shown in FIG. 10, both the still image file and the still information file are placed in the STILL directory, which is a subdirectory of the root directory 'BD'. The root directory further contains a plurality of title directories (TITLE001, TITLE002, . . . ) each of which contains PLAYLIST, CLIPIINF, and STREAM directories.

Figure 11:
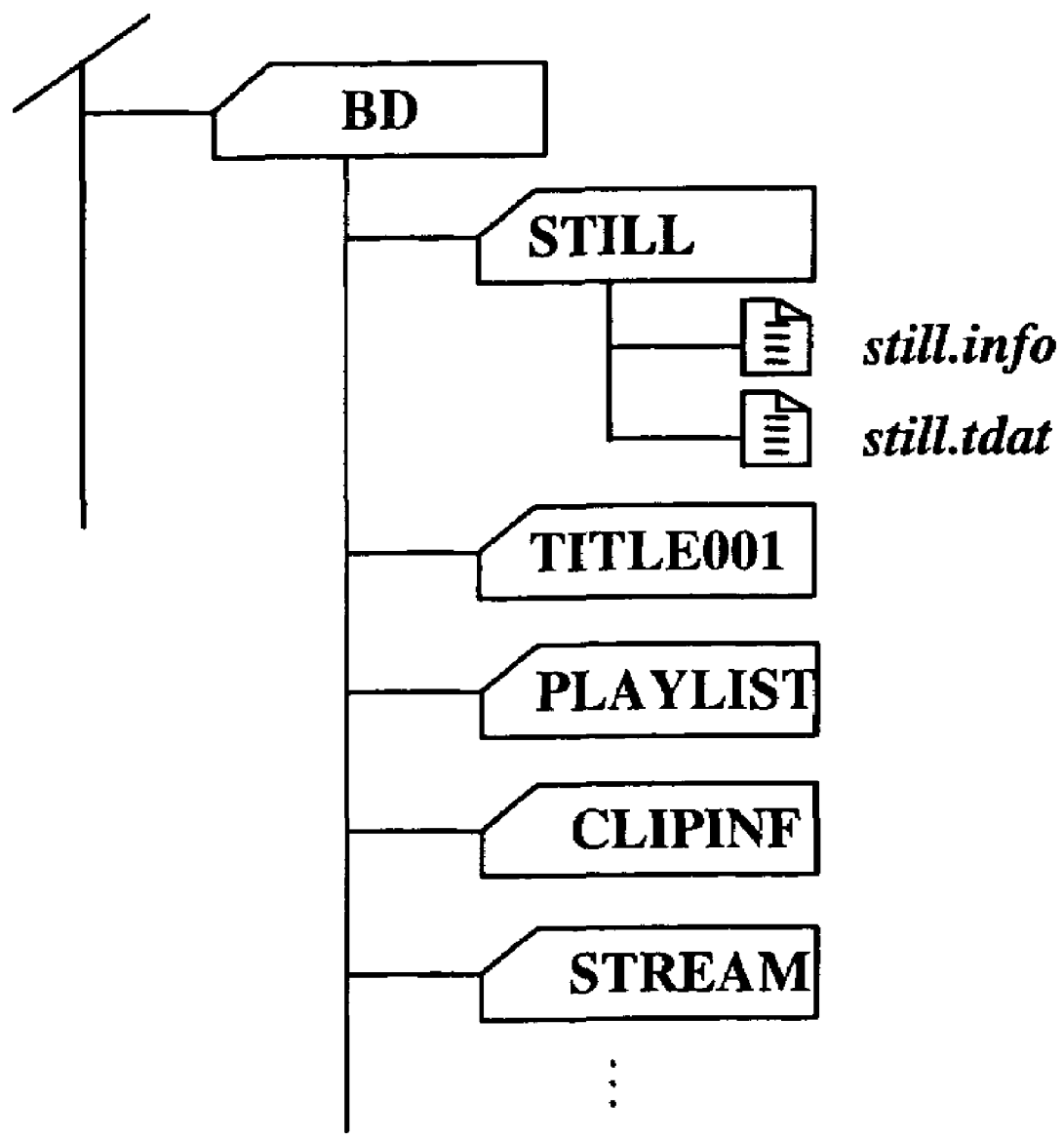

In a file structure shown in FIG. 11, both the still image file and the still information file are stored in the STILL directory, which is a subdirectory the root directory 'BD'. The root directory further contains TITLExxx, PLAYLIST, CLIPINF, and STREAM directories.

While the above-described embodiments have shown a single still image file and single still information file, it should be understood that the present invention is not limited to this file structure. Instead, a separate still image file may be provided for each still image or a subset of still images and/or a separate still information file may be provided for each still image or subset of still images. Alternatively, some combination of these embodiment may be provided.

Figure 12:
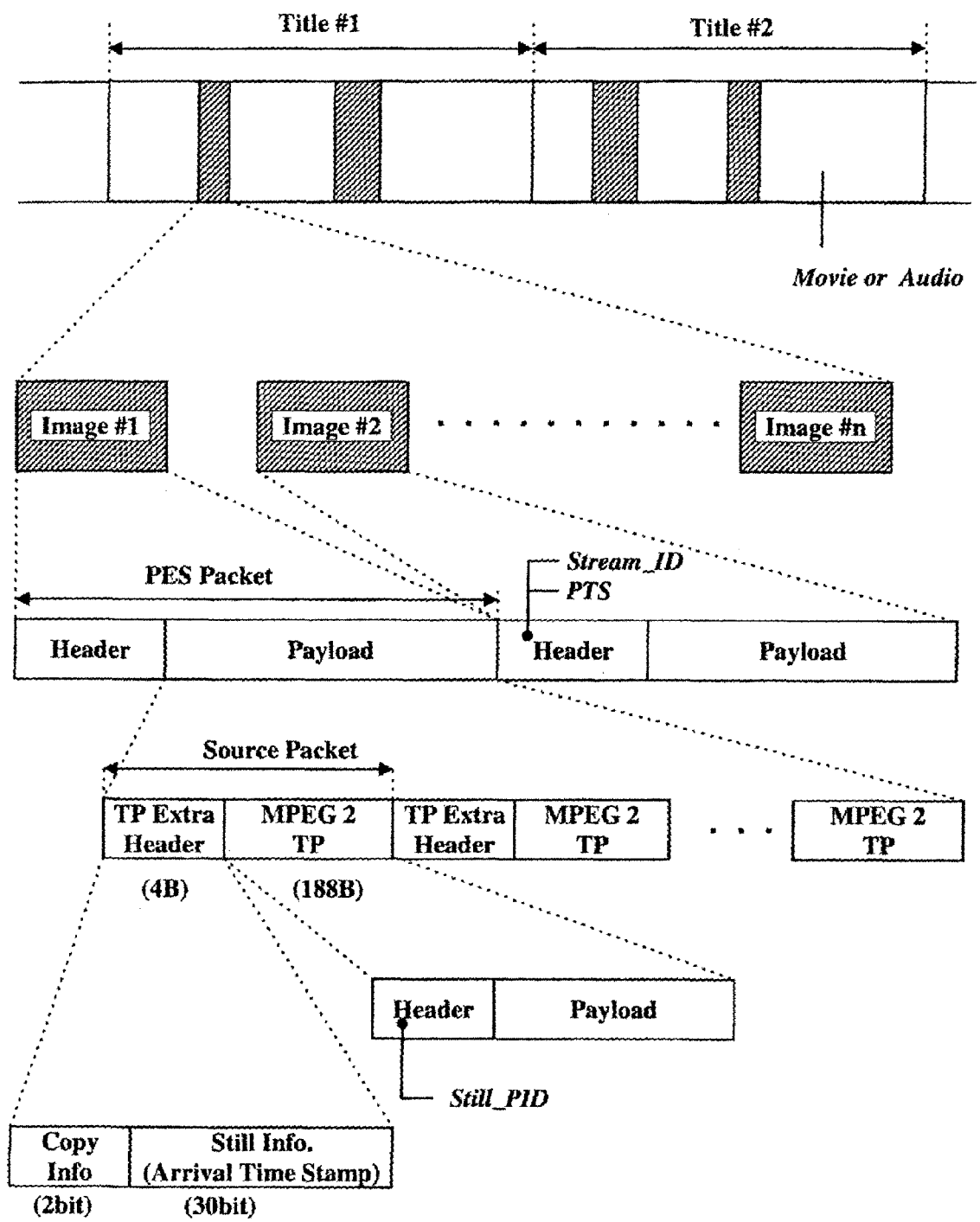
FIGS. 12-17 illustrate methods of recording still images and still information in accordance with additional embodiments of the present invention.

FIG. 12 illustrates a method of managing still images in accordance with another embodiment of the invention, wherein still images are intermittently inserted into each title, which includes movie video data or audio data. As shown, the title is recorded in the data area of a BD-ROM.

A still image (e.g., MPEG I, JPEG, etc.) recorded with movie video data in each title is stored as a PES (packetized elementary stream) packet. The header of a PES packet contains unique stream ID information for indicating that the data contained in the payload is a still image and a PTS (presentation time stamp) indicative of the display timing of the still image.

The payload of a PES packet comprises a plurality of source packets, each comprising a 4-byte TP (transport packet) extra header and a 188-byte MPEG2 TP (transport packet). The TP extra header comprises 2-bit copy information and 30-bit still information or packet arrival time stamp. In the case where the source packet corresponds to a still image, still information such as 'image start/end flag' is used instead of the packet arrival time stamp.

Figure 13:
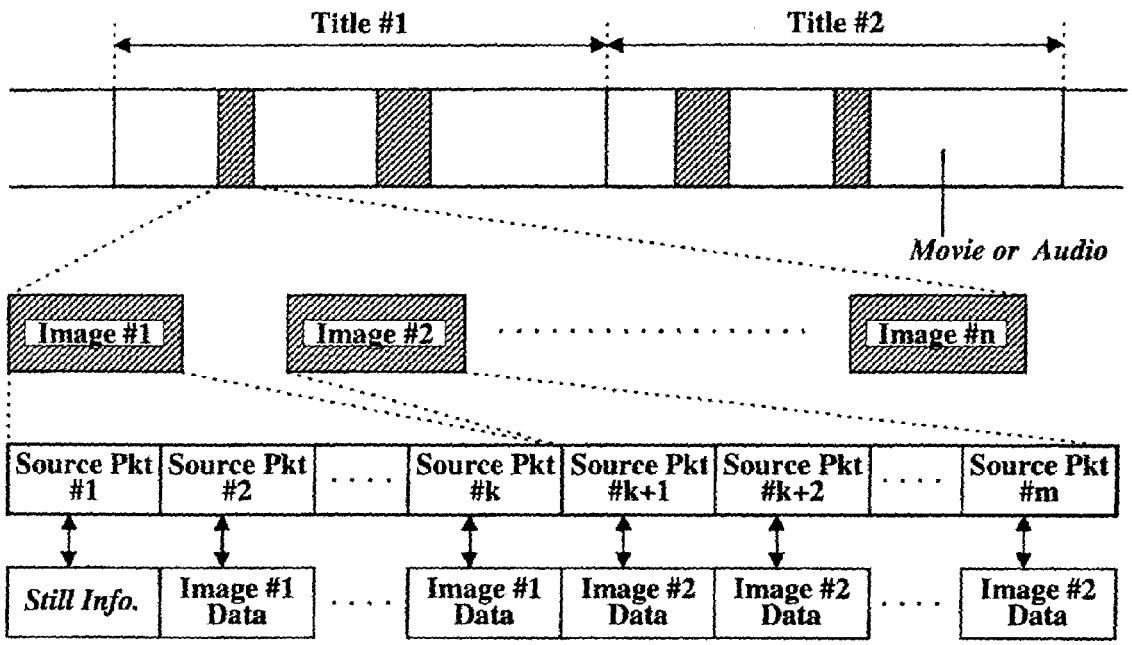
Figure 14:
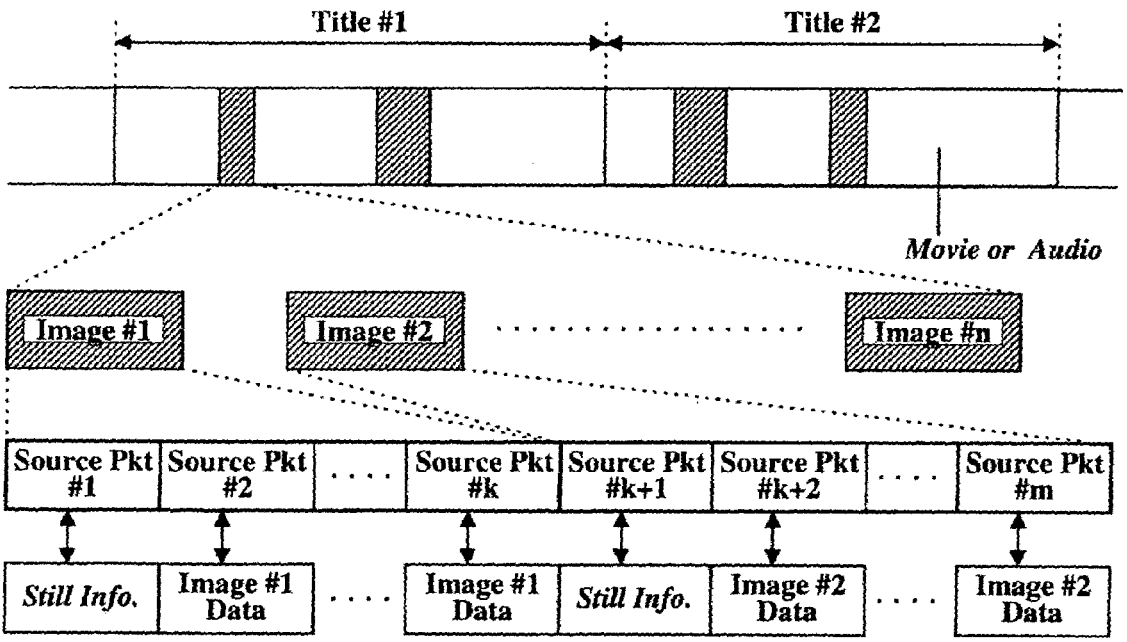
Figure 15:
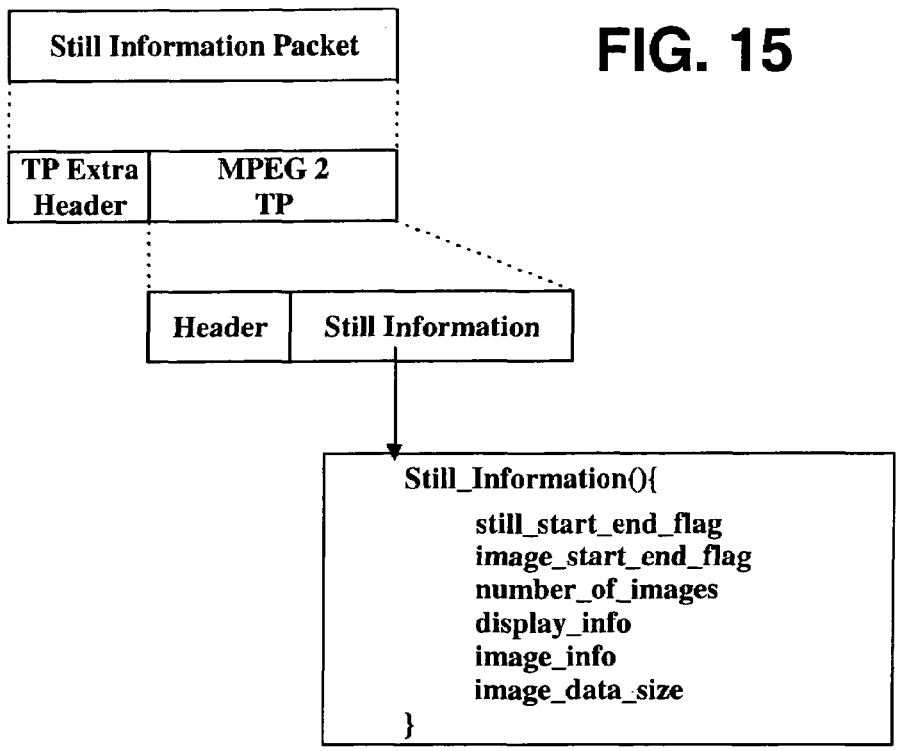

The header of an MPEG2 TP packet contains a still PID, which is given a value not previously used in the recording medium standard of interest, for example, '0x1023' in BD-RE. In an embodiment shown in FIG. 13, the first source packet among source packets carrying a plurality of still images has the still information such as the image start/end and image size for the still images In an embodiment shown in FIG. 14, the first source packet among source packets carrying a still image has still information such as the image start/end and image size for the still image. As shown in FIG. 15, the still information contains the fields of 'still_start_end_flag', 'image_start_end_flag', 'number_of images', 'display_info', 'image_info', 'image_data_size', etc.

For example, if the 'still_start_end_flag' field is '0', it indicates the still image start position. If the field is '1', it indicates that the still image end position. The 'number_of_images' field indicates the number of still images to be displayed.

The 'image_info' field indicates the attributes of the still image to be displayed and the display properties. The 'display_info' field indicates the display timing, display sequence, display effect, and the display effect period of the still image. The 'image_data_size' indicates the size of the still image.

Figure 16:
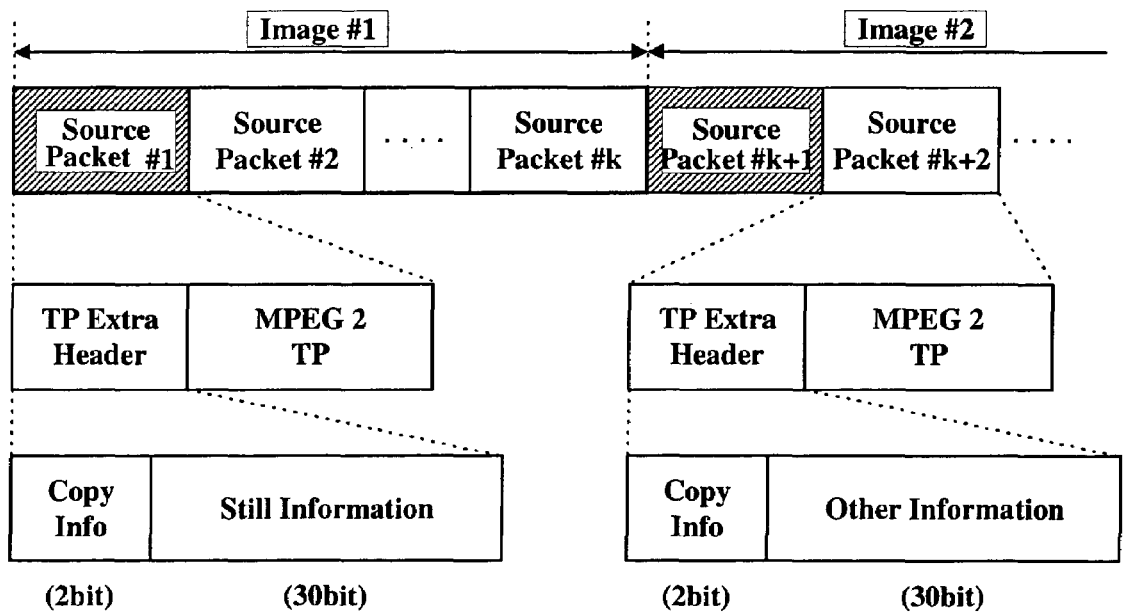

In an embodiment shown in FIG. 16, the still information is contained in the TP extra packet of the first source packet (Source Packet #1). The TP extra packet of the other source packets contains information other than the still information.

Figure 17:
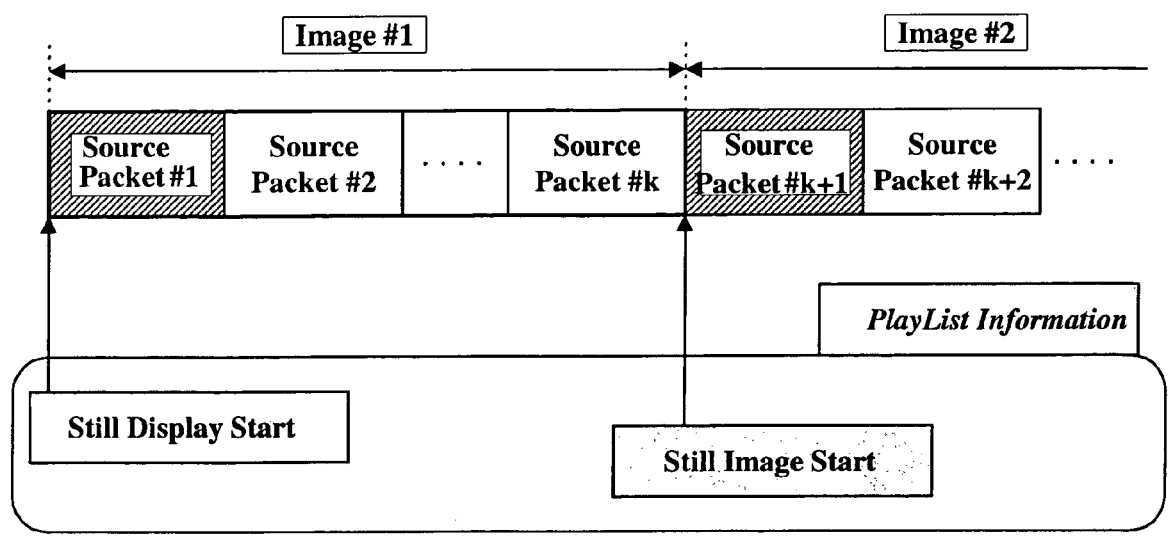

In an embodiment shown in FIG. 17, instead of storing the still information in source packets, still display start information and still image start information are stored in playlist information and such information is associated with corresponding source packets.

Figure 18:
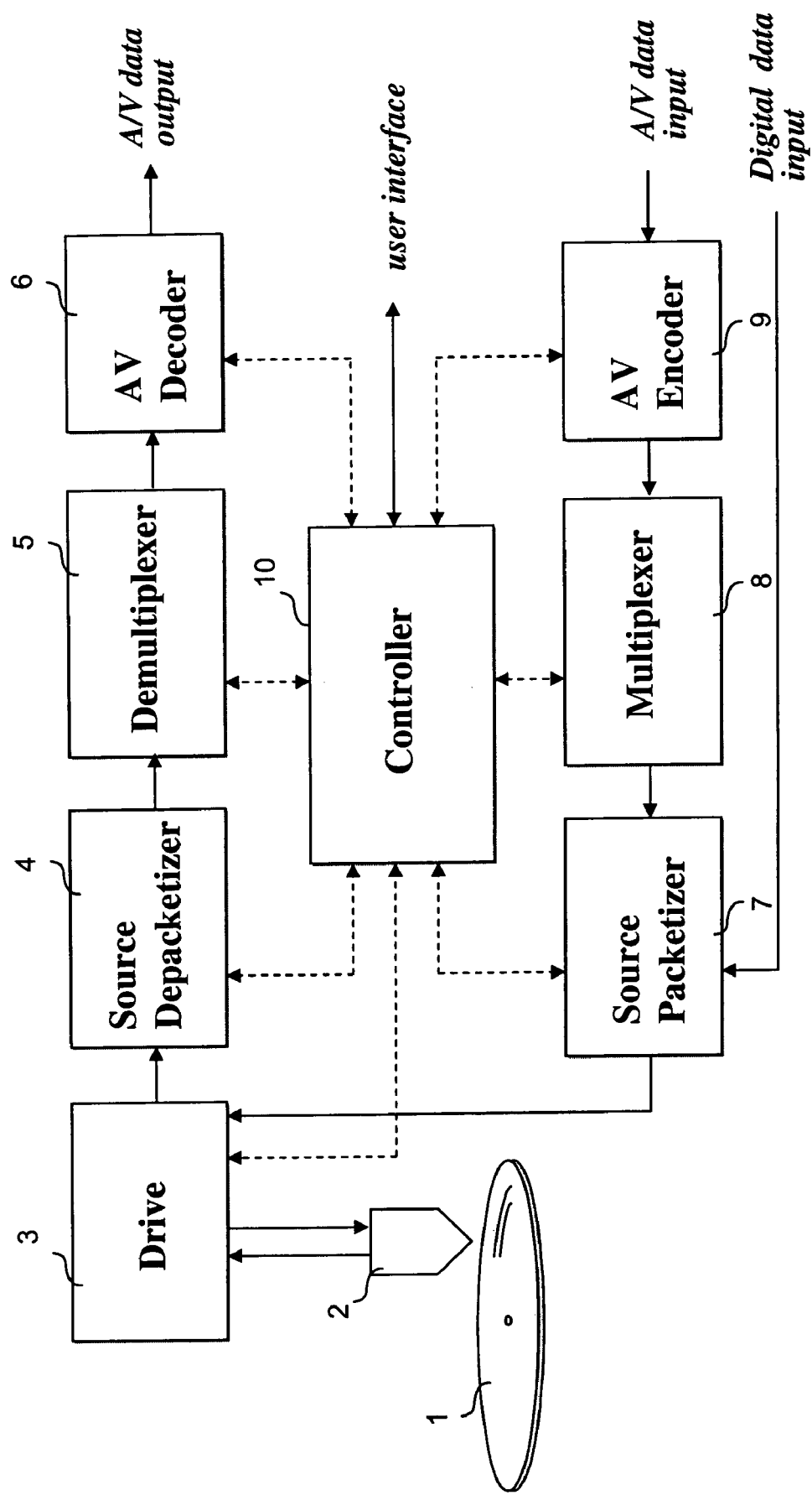
FIG. 18 illustrates a schematic diagram of an embodiment of an optical disk recording and reproduction apparatus of the present invention.

An optical disk reproducing apparatus outputs movie data and still images or audio data and still images to, for example, a connected television set by referring to navigation information according to the present invention such as still information file. FIG. 18 illustrates a schematic diagram of an embodiment of an optical disk recording and reproducing apparatus according to the present invention. As shown, an AV encoder 9 receives and encodes data (e.g., movie video and audio data, only audio data, and/or still image data). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 18, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-17 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced based on the navigation information provided in a still information file.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 18 has been described as a recording and reproducing apparatus, it will be understood that only a recording or only a reproducing apparatus may be provided using those portions of FIG. 18 providing the recording or reproducing function.

Figure 19:
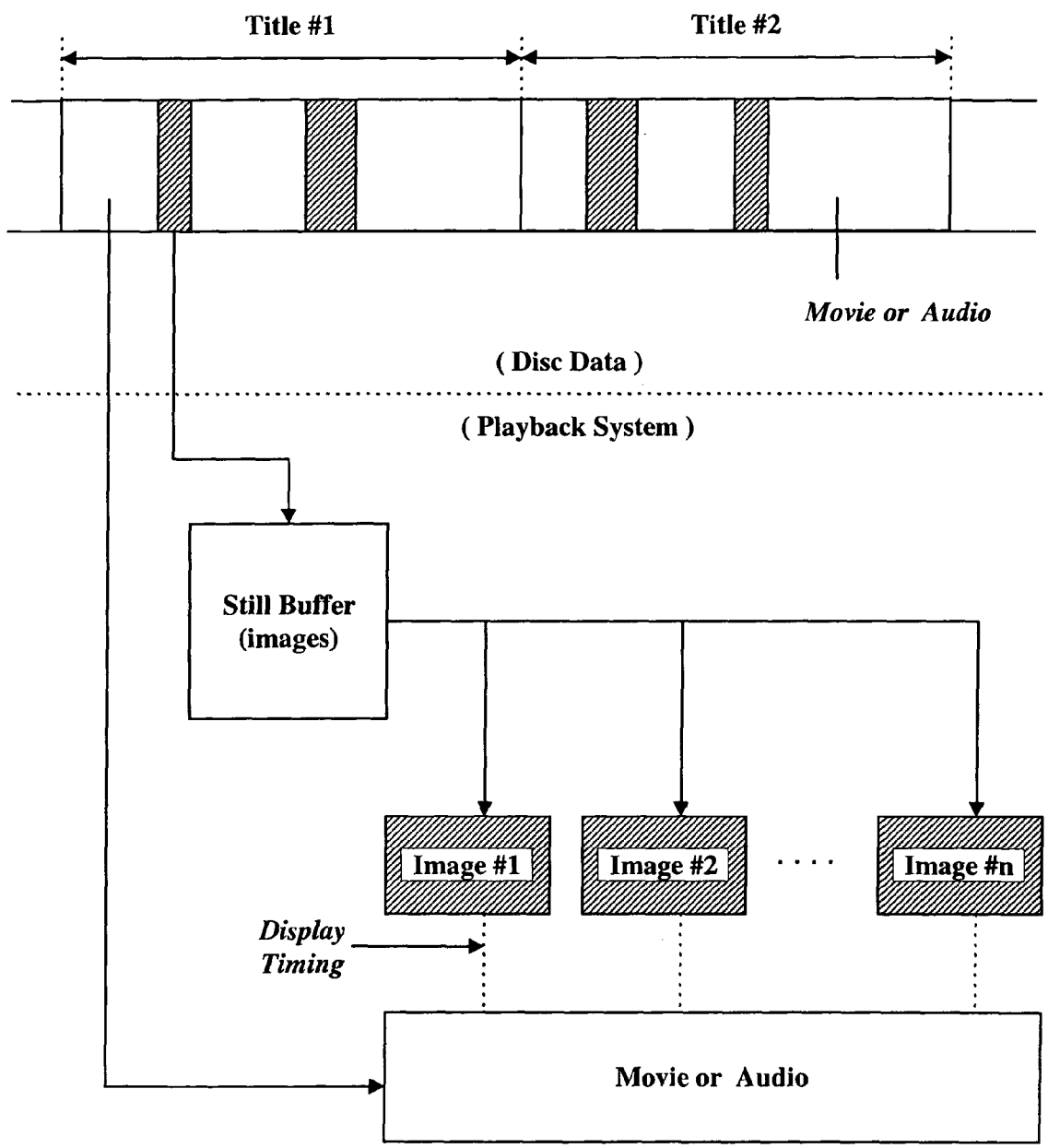
FIGS. 19 and 20 illustrate methods of playback of still images for a high-density recording medium in accordance with embodiments of the invention.

In FIG. 19, the apparatus reads still images intermittently recorded in each title with movie video and audio and stores the still images in a temporary buffer. Then, the apparatus performs still operations using the still information recorded in various ways as described above.

Figure 20:
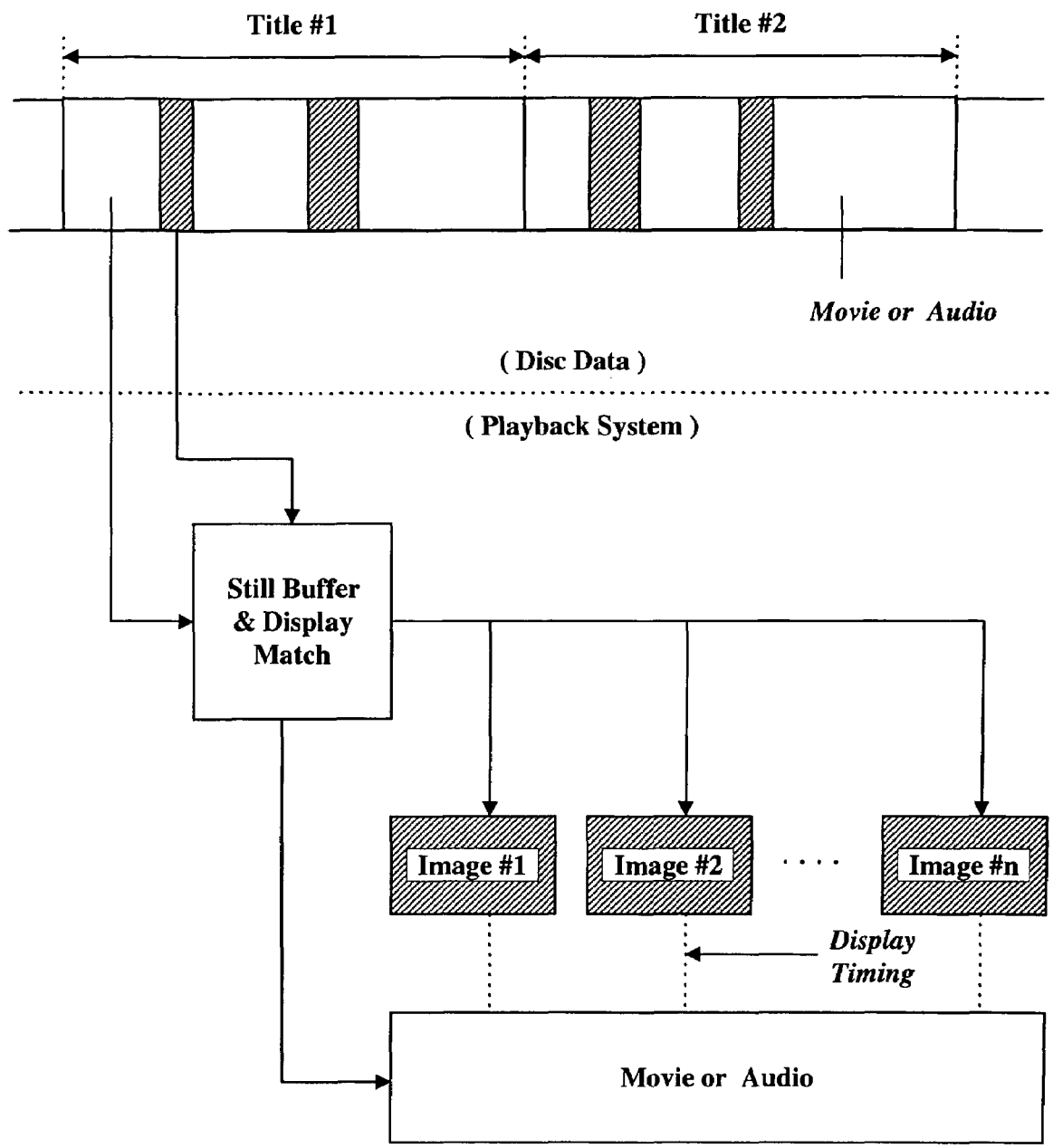

In FIG. 20, the optical disk reproducing apparatus reads still images with movie video and audio recorded in each title and stores the still images in an internal temporary buffer of the VDP system. Then, the apparatus performs still operations by synchronizing the timings of still images and video or audio data using the display time of still images and presentation time of video or audio data.

As will be appreciated from the forgoing disclosure, the present invention provides a recording medium having a data structure for managing still images recorded on a high-density recording medium (e.g., a high-density optical disk such as a BD-ROM). For example, the data structure allows for displaying movie video and still images or audio and still images in various ways.

As apparent from the above description, the present invention provides methods and apparatuses for recording a data structure on a high density recording medium for managing still images recorded on the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium having a data structure for managing reproduction of at least still images recorded on the recording medium, comprising:

a data area storing at least one clip stream file, the clip stream file including video data representing at least one still image, the clip stream file not including audio data;

a playlist area storing a playlist file, the playlist file including at least one playitem indicating an in-point and out-point of the clip stream file to reproduce at least one still image; and a clip information area storing at least one clip information file, the clip information file including a type indicator and a length indicator, the type indicator indicating that the clip information file is related to managing presentation of the still image, the length indicator indicating a size of the clip information file subsequent to the length indicator, wherein each still image in the clip stream file is recorded as a packetized elementary stream packet, and one still image is represented by one packetized elementary stream packet, and the clip stream file begins with a header of a packetized elementary stream packet.

2. The recording medium of claim 1, wherein the video data is recorded as one or more packetized elementary stream packets, and each packetized elementary stream packet includes at least one source packet.

3. The recording medium of claim 2, wherein each source packet includes at least one transport packet.

4. A method of reproducing a data structure for managing reproduction of at least still images recorded on a recording medium, comprising:

reproducing at least one clip stream file at a reproducing device, the clip stream file including video data representing at least one still image, the clip stream file not including audio data;

reproducing a playlist file at the reproducing device, the playlist file including at least one playitem indicating an in-point and out-point of the clip stream file to reproduce at least one still image; and reproducing at least one clip information file at the reproducing device, the clip information file including a type indicator and a length indicator, the type indicator indicating that the clip information file is related to managing presentation of the still image, the length indicator indicating a size of the clip information file subsequent to the length indicator, wherein each still image in the clip stream file is recorded as a packetized elementary stream packet, and one still image is represented by one packetized elementary stream packet, and the clip stream file begins with a header of a packetized elementary stream packet.

5. An apparatus for reproducing a data structure for managing reproduction of at least still images recorded on a recording medium, comprising:

a pick up configured to reproduce data recorded on the recording medium;

a controller configured to control the pick up to reproduce at least one clip stream file and a playlist file, the clip stream file including video data representing at least one still image, the clip stream file not including audio data, the playlist file including at least one playitem indicating an in-point and out-point of the clip stream file to reproduce at least one still image; and a controller configured to control the pick up to reproduce at least one clip information file, the clip information file including a type indicator and a length indicator, the type indicator indicating that the clip information file is related to managing presentation of the still image, the length indicator indicating a size of the clip information file subsequent to the length indicator, wherein each still image in the clip stream file is recorded as a packetized elementary stream packet, one still image is represented by one packetized elementary stream packet, and the clip stream file begins with a header of a packetized elementary stream packet.

6. A method of recording a data structure for managing reproduction of at least still images recorded on a recording medium, comprising:

recording at least one clip stream file at a recording device, the clip stream file including video data representing at least one still image, the clip stream file not including audio data;

recording a playlist file at the recording device, the playlist file including at least one playitem indicating an in-point and out-point of the clip stream file to reproduce at least one still image; and recording at least one clip information file at the recording device, the clip information file including a type indicator and a length indicator, the type indicator indicating that the clip information file is related to managing presentation of the still image, the length indicator indicating a size of the clip information file subsequent to the length indicator, wherein each still Image in the clip stream file is recorded as a packetized elementary stream packet, and one still image is represented by one packetized elementary stream packet, and the clip stream file begins with a header of a packetized elementary stream packet.

7. An apparatus for recording a data structure for managing reproduction of at least still images recorded on a recording medium, comprising:

a pick up configured to record data on the recording medium;

a controller configured to control the pick up to record at least one clip stream file and a playlist file, the clip stream file including video data representing at least one still image, the clip stream file not including audio data, the playlist file including at least one playitem indicating an in-point and out-point of the clip stream file to reproduce at least one still image; and the controller configured to control the pick up to record at least one clip information file, the clip information file including a type indicator and a length indicator, the type indicator indicating that the clip information file is related to managing presentation of the still image, the length indicator indicating a size of the clip information file subsequent to the length indicator, wherein each still image in the clip stream file is recorded as a packetized elementary stream packet, one still image is represented by one packetized elementary stream packet, and the clip stream file begins with a header of a packetized elementary stream packet.

8. The method of claim 4, wherein the video data is recorded as one or more packetized elementary stream packets, each packetized elementary stream packet includes at least one source packet, and each source packet includes at least one transport packet.

9. The apparatus of claim 5, wherein the video data is recorded as one or more packetized elementary stream packets, each packetized elementary stream packet includes at least one source packet, and each source packet includes at least one transport packet.

10. The method of claim 6, wherein the video data is recorded as one or more packetized elementary stream packets, each packetized elementary stream packet includes at least one source packet, and each source packet includes at least one transport packet.

11. The apparatus of claim 7, wherein the video data is recorded as one or more packetized elementary stream packets, each packetized elementary stream packet includes at least one source packet, and each source packet includes at least one transport packet.

\* \* \* \* \*